Patented Feb. 11, 1930

1,746,714

UNITED STATES PATENT OFFICE

WALTER E. PICHT, OF SEATTLE, WASHINGTON

PROCESS FOR PRESERVING FISH BAIT

No Drawing.  Application filed January 15, 1929. Serial No. 332,745.

This invention relates to an improved process for the preservation of fish of the character designed more particularly for use as bait.

The principal object of this invention is to improve upon the process in patent issued to me on November 16, 1928, No. 1,358,985. The principal feature of possible objection to said patent is that a considerable loss of strength of the formaldehyde results when that chemical is poured into the hot or boiling water and that the strength of the solution is thereby considerably diminished with a correspondingly less satisfactory result.

I have found that if a solution as set forth in my said patent, from which the salt petre is omitted, be employed, and the formaldehyde added after the solution becomes cool, the bait is preserved a greater length of time and in better condition. I have further found that it is preferable that the said cooled solution with the formaldehyde added be poured over the fish at the last bath and the fish preserved in that solution.

My improved process consists in selecting fish of a suitable character for bait, first dissolving about three pounds of salt in about two gallons of water, preferably hot. The solution is then allowed to become thoroughly cool. I now add about four tablespoonsful of formaldehyde to the thoroughly cooled mixture, thus avoiding evaporation of the formaldehyde. The cooled mixture, with the formaldehyde added, is then poured over selected fish bait, either cut or whole, the bait being well covered, using sufficient quantity of the bait to fill a vessel somewhat over half full so that when the final solution is poured over the bait, the bait will be entirely covered by the solution.

I now subject the bait to a series of baths of the solution just described by pouring off the solution from time to time by means of which the blood and slime are eliminated, then pouring in a fresh solution over the fish and when it is impregnated with blood and slime, pour the solution off again and again until there is no more indication of blood or slime in the solution. I then place the bait in a container, such as a jar or the like, and pour the cooled solution over it and preferably seal it.

The result of the above process is that the bait is free from blood or slime, has a natural appearance, is toughened sufficiently to prevent the fish hook from pulling out of the bait under ordinary strain, but without hardening the bait to make it unsuitable for use.

What is claimed to be new is:

A process for preserving fish for bait consisting in preparing a solution of about two gallons of hot water, three pounds of salt, allowing the solution to thoroughly cool, then adding four tablespoonsful formaldehyde to the solution and mixing thoroughly, immersing the bait in the cooled solution and pouring off the solution from time to time as blood and slime accumulate, and pouring a fresh solution over the bait until no blood or slime remains, packing the bait in a container, and pouring the cooled solution over the bait.

In testimony whereof I affix my signature.

WALTER E. PICHT.